United States Patent
Lipp

(10) Patent No.: US 11,013,210 B1
(45) Date of Patent: May 25, 2021

(54) SYSTEM AND METHOD FOR A PET CABINET

(71) Applicant: Donald Lipp, Woodstock, GA (US)

(72) Inventor: Donald Lipp, Woodstock, GA (US)

(*) Notice: Subject to any disclaimer, the term of this patent is extended or adjusted under 35 U.S.C. 154(b) by 0 days.

(21) Appl. No.: 16/996,936

(22) Filed: Aug. 19, 2020

(51) Int. Cl.
*A01K 1/01* (2006.01)
*A01K 1/00* (2006.01)
*A01K 29/00* (2006.01)

(52) U.S. Cl.
CPC .......... *A01K 1/0114* (2013.01); *A01K 1/0052* (2013.01); *A01K 29/005* (2013.01)

(58) Field of Classification Search
CPC .. A01K 1/0114; A01K 1/0052; A01K 1/0107; A01K 29/005
See application file for complete search history.

(56) References Cited

U.S. PATENT DOCUMENTS

| | | | |
|---|---|---|---|
| 3,144,852 A | 8/1964 | Messeas | |
| 3,428,026 A | 2/1969 | Sohmers et al. | |
| 3,872,832 A | 3/1975 | Quinn | |
| 4,090,470 A | 5/1978 | Williams | |
| 5,148,768 A * | 9/1992 | Hinton | A01K 1/0107 119/482 |
| 5,566,640 A * | 10/1996 | Krumrei | A01K 1/0107 119/165 |
| 5,749,317 A | 5/1998 | Richey et al. | |
| 5,769,026 A * | 6/1998 | Kohn | A01K 1/0107 119/165 |
| 6,182,612 B1 | 2/2001 | Ross | |
| 6,286,458 B1 | 9/2001 | Rawson | |
| 7,673,585 B1 * | 3/2010 | Emmi | A01K 1/0107 119/168 |
| 2006/0005777 A1 * | 1/2006 | Galindo, V | A01K 1/0107 119/165 |
| 2006/0272590 A1 * | 12/2006 | Pettys | A01K 1/0107 119/165 |
| 2009/0000560 A1 * | 1/2009 | Matsuo | A01K 1/0107 119/168 |
| 2011/0048330 A1 | 3/2011 | Mathews | |
| 2014/0053784 A1 * | 2/2014 | Auble | A01K 1/0107 119/165 |
| 2017/0258033 A1 * | 9/2017 | Dmoch | A01K 1/0107 |
| 2017/0318772 A1 * | 11/2017 | Amicarelli | A01K 1/0107 |
| 2019/0174710 A1 * | 6/2019 | Jakubowski | A01K 1/033 |
| 2019/0200567 A1 * | 7/2019 | Amicarelli | F16M 11/42 |
| 2019/0281786 A1 * | 9/2019 | Akers, II | A01K 1/0107 |

(Continued)

FOREIGN PATENT DOCUMENTS

| | | | | |
|---|---|---|---|---|
| CA | 3009392 A1 * | 1/2019 | .......... | A01K 1/0107 |
| WO | WO-2013146552 A1 * | 10/2013 | .......... | A01K 1/0154 |

OTHER PUBLICATIONS

IKuddle AutoPack Kitty Litter System, iKuddle.com [date accessed: May 5, 2020].

*Primary Examiner* — Monica L Barlow
*Assistant Examiner* — Aaron M Rodziwicz
(74) *Attorney, Agent, or Firm* — Christopher Mayle; Thomas E. La Grandeur; Bold IP, PLLC

(57) ABSTRACT

A system and method for an improved pet cabinet that provides an upper play area for a pet, a door panel opening leading to a litter box in a removable drawer, a sensor system to detect the presence of a cat, and a deodorizing system with deodorizing device, a filter, and a fan in communication with the sensor system.

19 Claims, 11 Drawing Sheets

(56) References Cited

U.S. PATENT DOCUMENTS

2019/0373844 A1\* 12/2019 Ward .................... A01K 1/0107
2019/0376837 A1\* 12/2019 Urata ................... A01K 1/0107
2020/0060221 A1\* 2/2020 Fan ..................... A01K 1/0114

\* cited by examiner

SYSTEM AND METHOD FOR A PET CABINET

FIELD OF THE DISCLOSURE

This disclosure relates to the field of pet houses and more particularly a pet cabinet with an upper play area and a lower area litter box having a deodorizing system that filter out odor and that also incorporates a plurality of sensors.

BACKGROUND

Pets can reduce stress, anxiety, and depression, ease loneliness, encourage exercise and playfulness, and even improve one's cardiovascular health. Caring for an animal can help children grow up more secure and active. Pets also provide valuable companionship for older adults. Many pet owners live in smaller houses or apartments, and thus face many challenges with respect to storing various pet items and providing a play area for the pet as well as a litter box. These various pet items also do not complement the decor of most homes. Thus, there exists a need for an improved pet cabinet that overcomes these shortcomings.

SUMMARY

In one embodiment, the present disclosure is directed to a cabinet for a pet, whereby the pet cabinet may include a housing having a bottom wall, a front panel, a back wall and two opposite side walls. The front panel may also have an opening and one or more flaps configured to cover the opening on the front panel. The cabinet may include a movable drawer positioned between the side walls, whereby the movable drawer is slidably disposed within an opening below the front wall of the housing. The movable drawer may be configured to hold pet litter or another type of litter, whereby the litter is accessible to the pet when the pet enters through the opening of the front panel. The cabinet may further include a first shelf support component positioned above the bottom section of the housing, whereby the shelf support component includes a block extending from the top surface of the first shelf support component configured to house the electronics. The pet cabinet may further include a dispensing device secured to the housing and one or more sensors secured to an interior surface of the front panel. The one or more sensors may be configured to detect the presence of a pet within the housing. The pet cabinet may further include an exhaust fan secured to the housing, whereby the exhaust fan is configured to direct air out of the housing into a filter. The exhaust fan may be in communication with the one or more sensors as well as a dispenser.

In one embodiment, the pet cabinet may further include, a connector piece configured to connect to a dryer vent pipe or piping. The pet cabinet may further include a ramp that is connected to the first shelf support component. In one embodiment, the pet cabinet may further include synthetic carpet on the top surface of the first shelf component. Further, the pet cabinet may include flaps that are two rubber strips located in an arch shaped window disposed in the front panel of the housing. Additionally, the pet cabinet may further include a second shelf support component, whereby the circuitry for any sensors located in the housing of the cabinet may be housed in a cavity formed between the first shelf support component and the second shelf support component.

In one embodiment, the pet cabinet may include a computing device with one or more processors, whereby the one or more processors are configured to wirelessly receive one or more control signals from the sensors and to transmit a notification when the pet has entered or exited the cabinet. Further, the one or more processors may be configured to control a state of the cabinet, whereby controlling the state includes changing dispensing duration or the exhaust fan duration in the cabinet. Further, the processors of the computing device may be configured to modify a state of the dispenser or exhaust fan at times based upon synchronization with at least a particular time on a clock or calendar. Further, the one or more sensors that may be included in the cabinet may include any one of an infrared sensor, a light sensor, a proximity sensor, or a motion sensor.

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
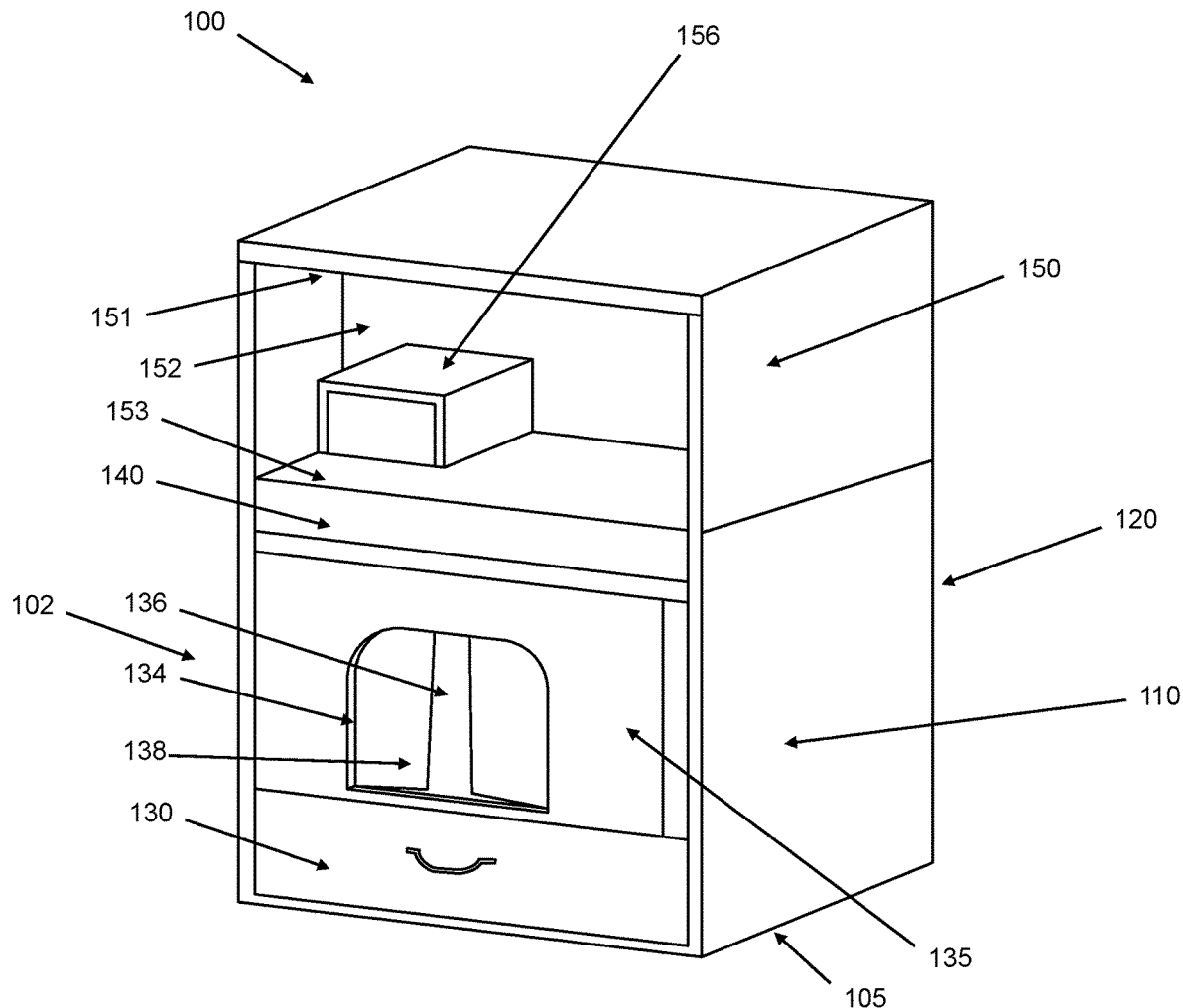
FIG. 1 shows a perspective view of a pet cabinet in accordance with an illustrative embodiment.

In the Summary above and in this Detailed Description, and the claims below, and in the accompanying drawings, reference is made to particular features (including method steps) of the invention. The term "comprises", and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure recognizes the unsolved need for an improved pet cabinet. In one non-limiting embodiment, the pet cabinet may include an upper play area for a pet to play or rest in as well as an a litter box that may be located in a drawer of the pet cabinet. The pet cabinet may further include a sensor system designed to detect the presence of a pet when the pet is located in the pet cabinet. Further, in a non-limiting embodiment, the pet cabinet may include a deodorizing system with a filter and a fan in communication with a sensor system, as well as an attachable duct system. The pet cabinet, according to one or more non-limiting embodiments, is completely customizable whereby the many components may be positioned on any side of the cabinet such that the cabinet is more suitable for the specific needs of the household and pet.

With reference now to FIG. 1, FIG. 1 shows one exemplary embodiment of pet cabinet 100. Pet cabinet 100 may include a lower portion 102. The housing of the pet cabinet 100 may include a bottom surface 105. It is intended that the bottom surface 105 of the cabinet 100 may make contact with a supporting structure, such as a floor, table, or other surface.

Pet cabinet 100 also includes a pair of side walls 110 which are generally parallel to one other and spaced apart from each other and extend upwardly from bottom surface 105. Pet cabinet 100 may have a back surface 120 secured to the bottom surface 105 and side walls 110.

Figure 2:
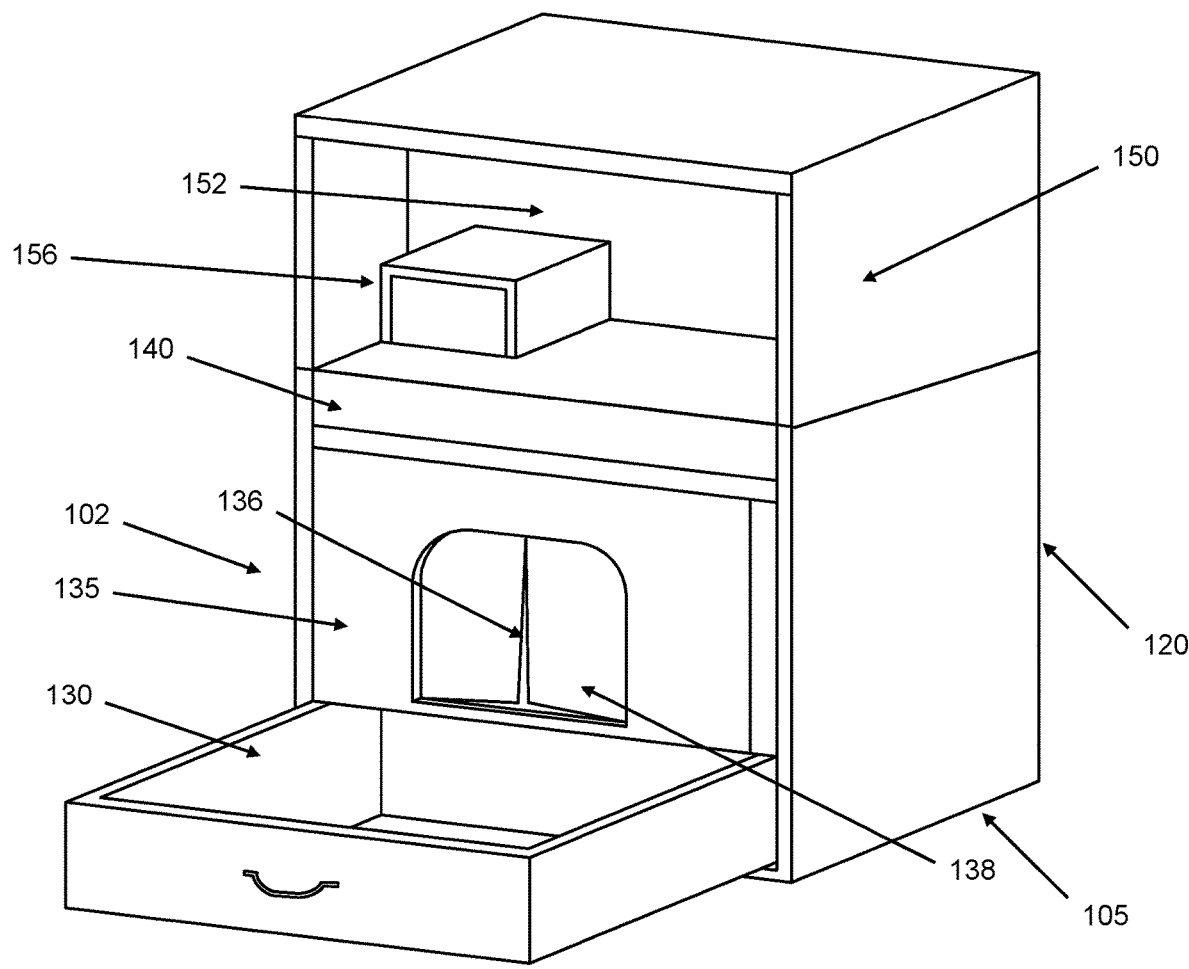
FIG. 2 shows a perspective view of a pet cabinet with a movable drawer extended outward in accordance with an illustrative embodiment.
Figure 3:
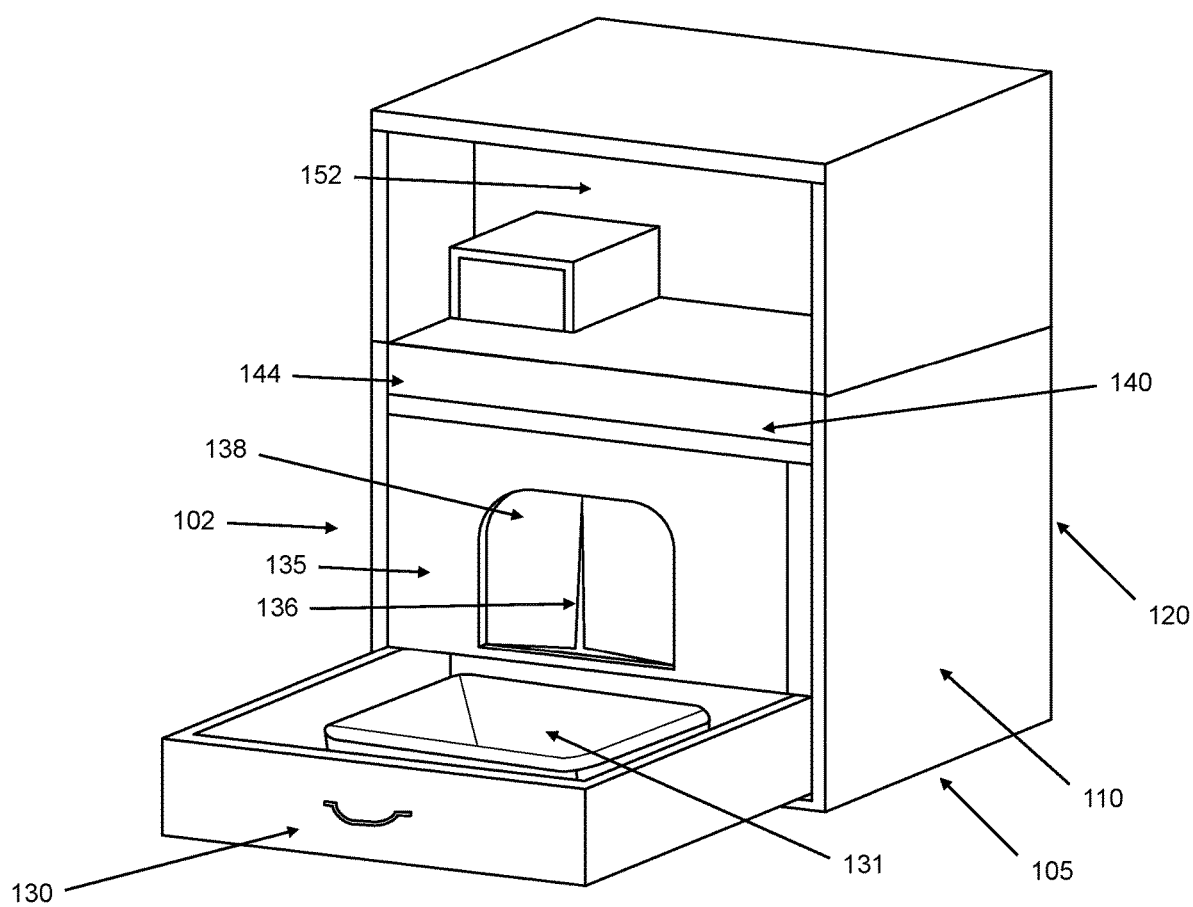
FIG. 3 shows a perspective view of a pet cabinet with the movable drawer extended outward and a pet litter box located inside the movable drawer in accordance with an illustrative embodiment.

A movable drawer 130 may be positioned in the lower portion 102 of pet cabinet 100 between side walls 110 as illustrated in FIG. 1 and FIG. 2. Drawer 130 may have a rectangular shape with a bottom surface and sidewalls, however, the drawer 130 may be designed differently in other embodiments and include other shapes such as a tube or cube or any other shape. Drawer 130 may be lined and sealed with plexiglass or another material to prevent odors and excrement from damaging the wood or other material of pet cabinet 100. Pull out slides may be fastened between side walls 110 of the housing of the pet cabinet 100 and the sidewalls of drawer 130 such that drawer 130 may be moved independently from the pet cabinet 100. Drawer 130 is configured to hold pet litter or other contents whereby drawer 130 allows the contents to be hidden when drawer 130 is in a closed position as well as prevent the contents from being thrown out of pet cabinet 100 by the pet. When drawer 130 is in an open position as shown in FIG. 2 and FIG. 3, a user may remove the excrement from the pet litter as well as replace the litter when needed. In other non-limiting embodiments, a litter box 131 may be placed inside of drawer 130 as illustrated in FIG. 3. Accordingly, drawer 130 may be slid opened and shut by the user or automatically by a computing device to provide the pet access to the interior region of the drawer 130 as well as the litter box 131.

Pet cabinet 100 may have a front panel 135 as shown in FIG. 1 secured to side sidewalls 110. Front panel 135 may have an opening 136 as shown in FIG. 1. The front panel 135 may include an arch shaped window 134 as shown in FIG. 1. The arch shaped window may define the opening 136 located in the front panel 135. As shown in FIG. 1, one or more flaps 138 may cover the opening 136. Flaps 138 may be two strips that are sized and designed to fit within the opening 136 of the arch shaped window 134. Flaps 138 may be made of flexible material such as rubber. Flaps 138 may also be designed to harmonize with the color and texture of the materials used to make pet cabinet 100.

The drawer 130 that is located beneath the front panel 135 and beneath the arch shaped window 134 as shown in FIG. 1 in the front panel 135 may be accessed by a pet through the opening 136 of the arch shaped window 134 in the front panel 135. Accordingly, in one embodiment, a pet may move through opening 136 on front panel 135 causing flaps 138 to swing or sway back such that the pet may easily move into the interior of drawer 130 to access any pet litter or other contents located inside drawer 130. Any litter that is interacted with or used by the pet remains within the housing since an interior of drawer 130 is sealed within pet cabinet 100 when closed. In an opposite motion, the pet may move back through opening 136 causing flaps 138 to swing or sway forward whereby the pet may exit pet cabinet 100. Thus, the drawer 130 may be pulled open so the pet may access any interior contents within the drawer 130 including the litter located therein or the pet may move through the opening 136 located in the front panel 135 of the housing of the pet cabinet 100, which would also provide the pet with access to the interior of the drawer 130.

Figure 4:
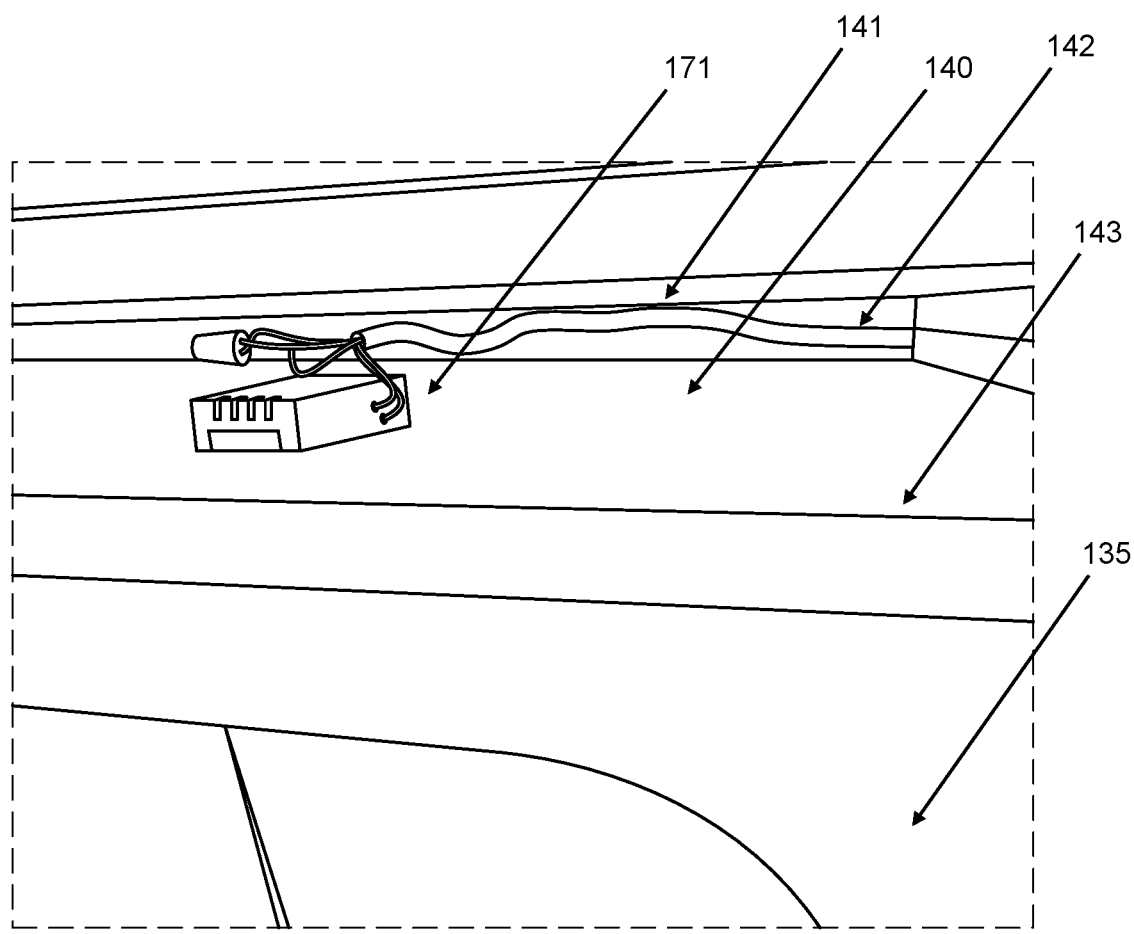
FIG. 4 shows a view of the circuitry of the sensor system within a shelf support component in accordance with an illustrative embodiment.

As shown in FIG. 1, a shelf support component 140 may be positioned above the lower portion 102 of the cabinet 100 and the side walls 110. The shelf support component 140 may be secured to and extend between the side walls 110, the front panel 135, and the back surface 120 of the cabinet 100. Shelf support component 140 may have a top surface 141 and a bottom surface 143 as shown in FIG. 4, as well as a front surface 144 (e.g. front surface 144 shown in FIG. 3) whereby a cavity 142 is formed between top surface 141 and bottom surface 143 of the shelf support component 140 as illustrated in FIG. 4. In a non-limiting embodiment, cavity 142 may be used as a storage space for a sensor system, electronics, or other circuitry.

Figure 5:
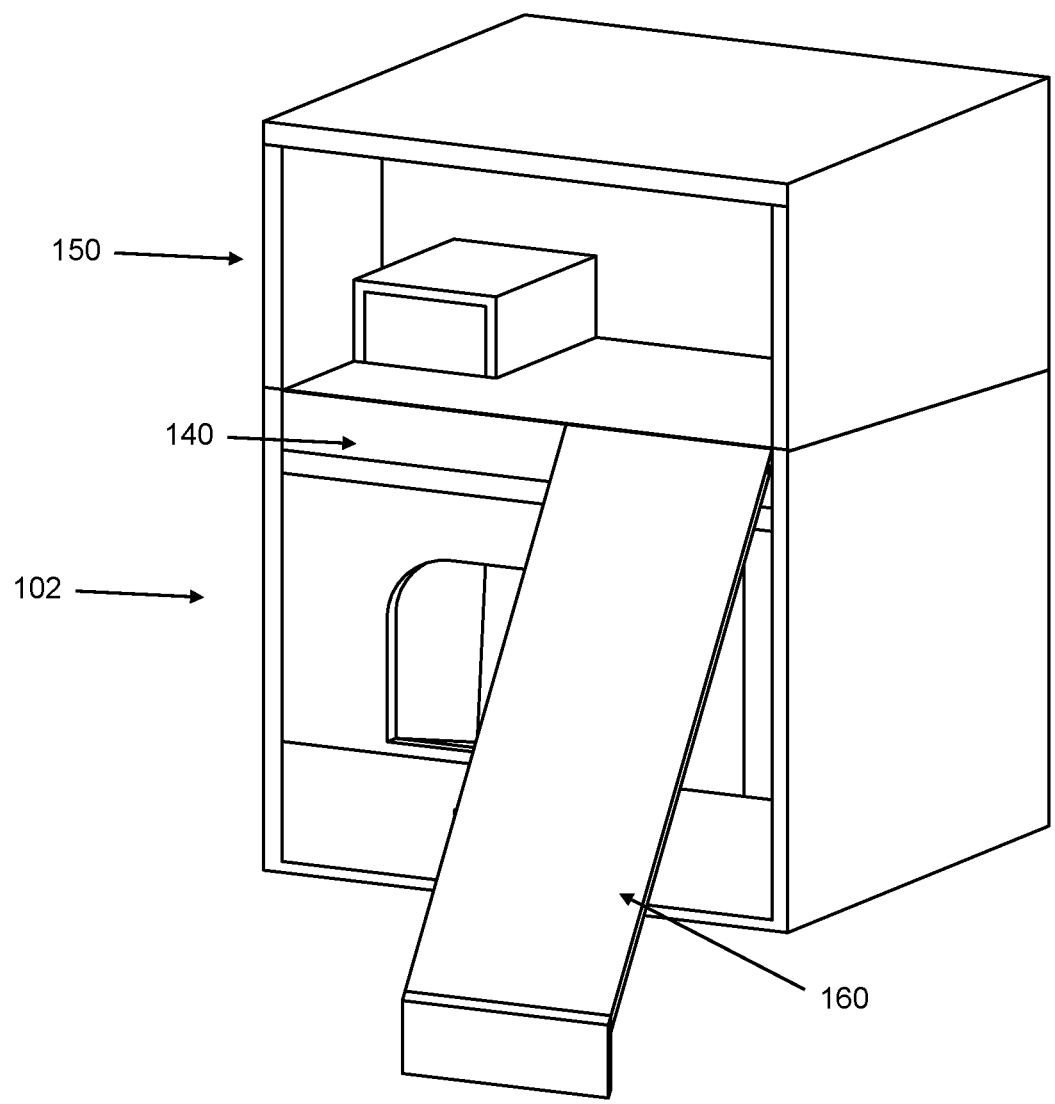
FIG. 5 shows a perspective view of a pet cabinet with an extendable ramp in accordance with an illustrative embodiment.

As shown in FIG. 5, in some embodiments, an angled ramp 160 may be connected to shelf support component 140. Ramp 160 may include an angled ramp surface, a ramp top, and a ramp base. The ramp 160 may angle from the shelf support component 140 towards the surface of the floor or other object that the pet cabinet 100 rests upon. Ramp base is generally located near sidewalls 110 away from opening 136 such that access to opening 136 is not impeded. Ramp 160 may be made of two or more planks whereby the planks may be coupled to one another at the distal ends by one or more pivotable hinges. The planks may be folded on top of one another whereby they are parallel to one another or extended out whereby they are adjacent to one another. Shelf support component 140 may include a receiving attachment or other slot for securing the planks of the ramp 160 within cavity 142 of the shelf support component 140. Front panel 144 of the shelf support component 140 may be removable so the user can access the interior cavity 142.

In one or more non-limiting embodiments, a second shelf support component 150 may be located above the first shelf support component 140 as illustrated in FIG. 1. Shelf support component 150 may have a top surface 151 and a bottom surface 153 whereby a cavity 152 is formed between the top surface 151 and the bottom surface 151 of the second shelf support 150 as shown in FIG. 1. The cavity 152 of the second shelf support 150 may be used as a storage space for a pet and may include items such as food, extra litter, or cleaning supplies. Advantageously, the cavity 152 of the second shelf support 150 may also serve as an interactive play area for the pet whereby the pet can crawl into the cavity 152 and rest or play. In one or more non-limiting embodiments, the top surface 151 of shelf support component 150 may be covered in carpet or any other material to provide comfort to the pet. Further, shelf support component 150 may be made of different materials. Shelf support component 150 may have a block 156 as shown in FIG. 1 in the corner of the second shelf support 150 for housing the electrical and mechanical components of pet cabinet 100. Alternatively, the block 156 may also serve as a stand for items such as a water bowl or food bowl in one or more non-limiting embodiments. A bowl (not shown) may be placed on the top surface of the block 156 so that the bowl and its contents are easily accessible by the pet.

In some embodiments, second shelf support component 150 may be separated from the remainder of pet cabinet 100 whereby the user may customize and replace shelf support component 150. In these embodiments, shelf support component 150 may have a lowered plane edge portion extending downward past the bottom surface 153 of shelf support component 150. The edge portion is configured to be retained on receiving slots of top surface 141 of shelf support component 140. Shelf support component 150 and shelf support component 140 may also be affixed to one another using, without limitation, fasteners, adhesive, latches, hinges, welding techniques, or any other method known to those skilled in the art.

Figure 6:
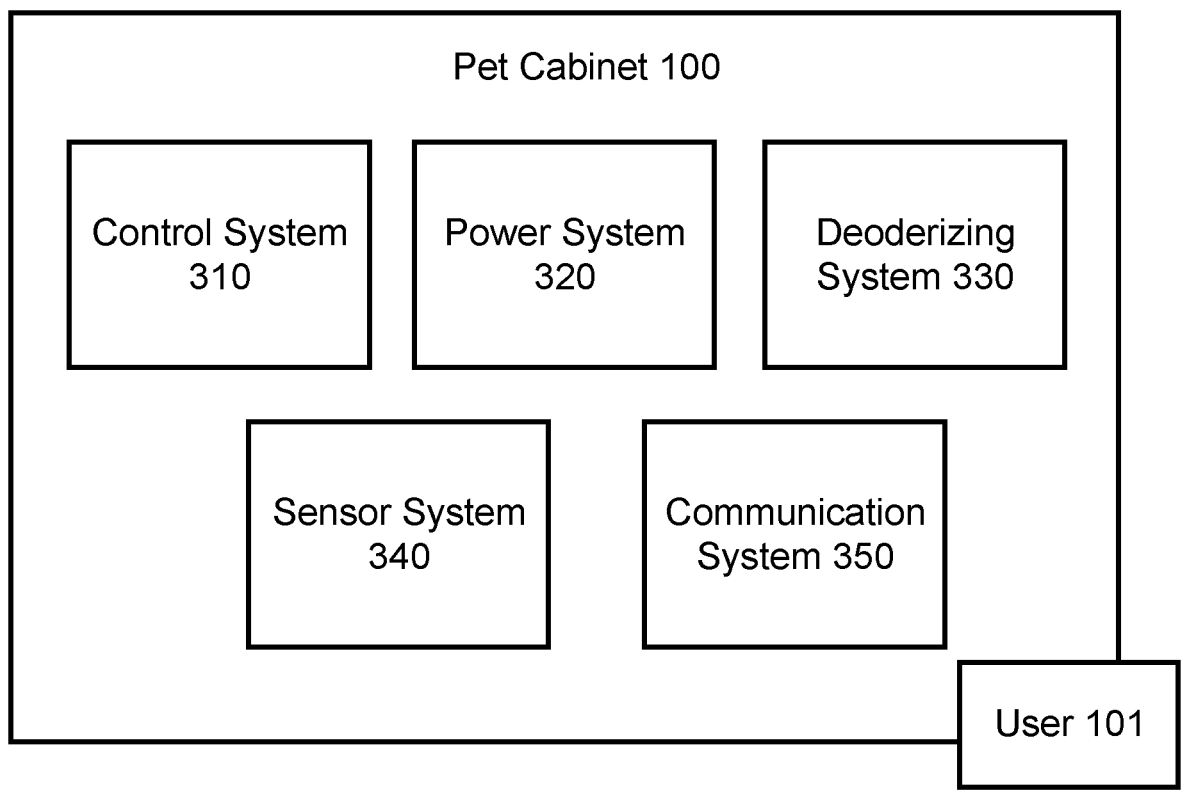
FIG. 6 shows a block diagram for a pet cabinet in accordance with an illustrative embodiment.
Figure 7:
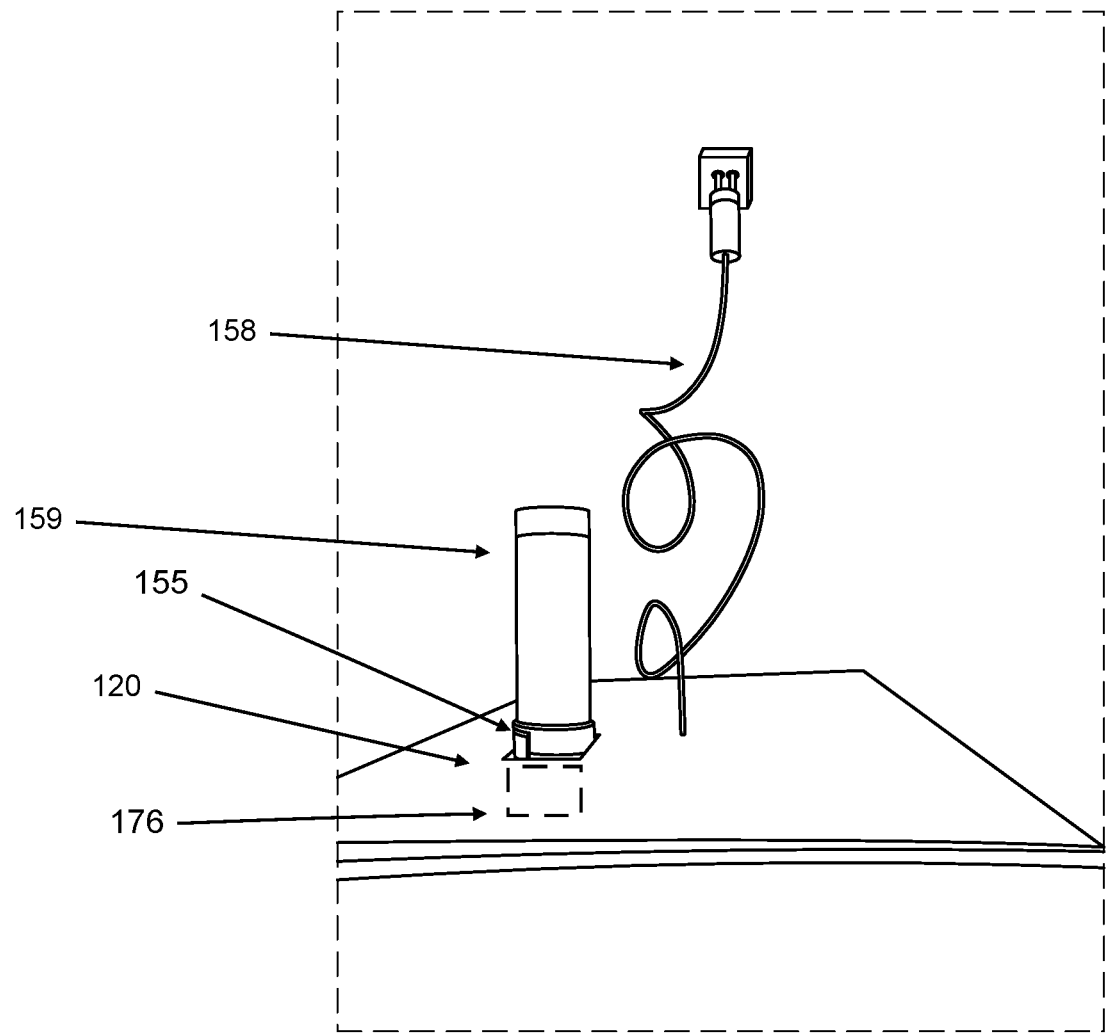
FIG. 7 shows a perspective view of the back of the pet cabinet with a filter in accordance with an illustrative embodiment.

With reference now to FIG. 6, FIG. 6 illustrates a block diagram of one exemplary embodiment of pet cabinet 100. Pet cabinet 100 may have a plurality of systems including a control system 310, a power system 320, a deodorizing system 330, a sensor system 340, and a communication system 350, which may be integrated into the overall system and structure of pet cabinet 100 and utilized by user 101. Power system 350 of cabinet provides the power to pet cabinet 100, sensor system 340, and the circuits and components of control system 310. Pet cabinet 100 may be powered by methods known by those of ordinary skill in the art. In some embodiments, pet cabinet 100 may plug into an electrical outlet using an electrical cord 158, as illustrated in FIG. 7, to supply power to deodorizing system 330, sensor system 340, and the circuits and components of control system 310. Further power system 320 may include a rechargeable battery pack whereby the rechargeable battery is of a charge, design, and capacity, to provide sufficient power to deodorizing system 330, sensor system 340, and the circuits and components of control system 310 while running systems of pet cabinet 100 for a set period of time needed to deodorize or sanitize one or more targeted locations within pet cabinet 100. As shown in FIG. 7, the electric cord 158 may extend through an opening in the back surface 120 of the pet cabinet 100 in one or more non-limiting embodiments, although those of ordinary skill understand that the electric cord 158 may extend from any other surface of the pet cabinet 100 in alternative embodiments.

Control system 310, as illustrated in FIG. 6, may operate to control the actuation of the other systems. Control system 310 may utilize one or more computing devices which will be discussed in detail later in the description. Control system 310 may be in the form of, a circuit board, a memory or other non-transient storage medium in which computer-readable coded instructions are stored and one or more processors are configured to execute the instructions stored in the memory. Control system 310 may have a wireless transmitter, a wireless receiver, and a related computer process executing on the one or more processors.

A computing devices associated with the control system 310 may be any type of computing device that typically operates under the control of one or more operating systems, which control scheduling of tasks and access to system resources. Computing devices may be a phone, tablet, television, desktop computer, laptop computer, gaming system, wearable device electronic glasses, networked router, networked switch, networked, bridge, or any computing device capable of executing instructions with sufficient processor power and memory capacity to perform operations of control system 310.

The one or more computing devices may be integrated into control system 310, while in other non-limiting embodiments, control system 310 may be a remotely located computing device or server configured to communicate with one or more other control systems 310. Control system 310 may also include an internet connection, network connection, and/or other wired or wireless means of communication (e.g., LAN, etc.) to interact with other components. The connection allows a user to update, control, send/retrieve information, monitor or otherwise interact passively or actively with control system 310.

Control system 310 may include control circuitry and one or more microprocessors or controllers acting as a servo control mechanism capable of receiving input from sensor system 340 and communication system 350, analyzing the input from sensor system 340 and communication system 350, and generating an output signal to deodorizing system 330, communication system 350 and power system 320. The microprocessors (not shown) may have on-board memory to control the power that is applied to deodorizing system 330, power system 320, and communication system 350 in response to input signals from the user and from sensor system 340.

Control system 310 may include circuitry to provide an actuable interface for a user to interact with, including switches and indicators and accompanying circuitry for an electronic control panel or mechanical control panel. Such an actuable interface may present options to the user to select from that would allow the user to control how much deodorizing agent should be dispensed in accordance with the deodorizing system 330. Control system 310 may be preprogrammed with any references values, by any combination hardwiring, software, firmware to implement various operational modes including but not limited to temperature, light, and humidity values.

The microprocessors in control system 310 may also monitor the current state of circuitry within control system 310 to determine the specific mode of operation chosen by the user. For instance, when "on", the microprocessors may begin autonomously dispensing deodorizing agent at predetermined intervals. Further, such microprocessors that may be part of control system 310 may receive signals from any of or all systems, including without limitation, the dispensing system 330, power system 320, and communication system 350. Such systems may be notified whether any of the components in the various systems need to be replaced, whether a component needs to be recharged or refilled, as well as when the targeted location has been deodorized or sanitized within pet cabinet 100.

Sensor system 340 may include one or more suitable types of sensors, such as an optical sensor, an image capturing device such as a still camera or video camera, an audible sensor, a proximity sensor, a movement sensor, or a weight sensor. Sensor system 340 may have infrared ("IR") detectors having photodiode and related amplification and detection circuitry. In one or more other non-limiting embodiments, radio frequencies, magnetic fields, and ultrasonic sensors and transducers may be employed.

Figure 8:
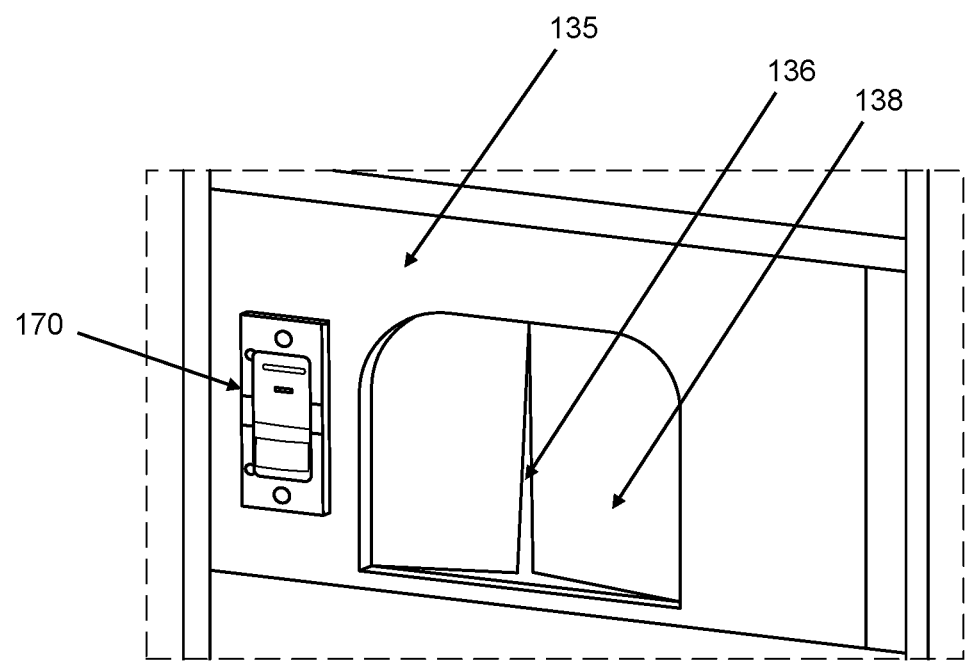
FIG. 8 shows an interior view of the sensor system and flaps covering an opening of the pet cabinet in accordance with an illustrative embodiment.

Sensors may be arranged in any number of configurations and arrangements. For example, a sensor 170 as shown in FIG. 8 may be mounted to an interior surface of the front panel 135 of the pet cabinet 100, whereby sensor 170 may detect any movement of the flaps 138 in relation to the opening 136, and thereby detect the entrance of a pet into the interior chamber of the arch shaped window as illustrated in FIG. 8. In a non-limiting embodiment, the circuitry and wiring 171 of sensor system 340 may be stored in cavity 142 of shelf support component 140 as illustrated in FIG. 4. In other embodiments, one or more sensors that make up the sensor system 340 within the pet cabinet 100 may have an omnidirectional viewing area by having these sensors attached to or otherwise mounted on shelf support component 150 to form a 180 degrees field of view. In an alternative embodiment, the sensors that make up the sensor system 340 may be attached to or otherwise mounted on the front panel 135 of the pet cabinet 100.

Figure 9:
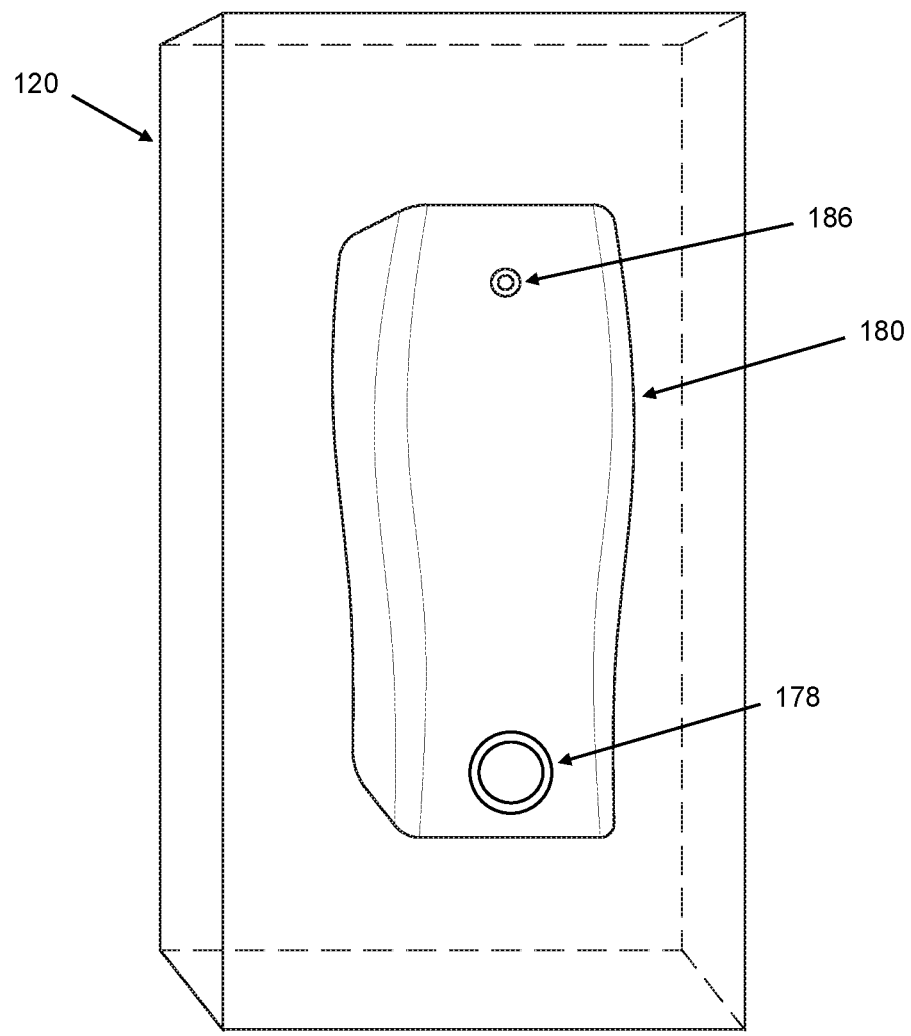
FIG. 9 shows a perspective view of a dispenser device associated with the pet cabinet in accordance with an illustrative embodiment.

Turning to FIG. 9, FIG. 9 shows an example of a dispensing device 180 that may be part of the dispensing system 330 shown in FIG. 6. In a non-limiting embodiment, dispensing device 180 is adapted to dispense a deodorizing agent from a dispenser container that may be connected to an inside surface of pet cabinet 100. Dispensing device 180 may interchangeably be referred to herein as a deodorizer as well.

Figure 11:
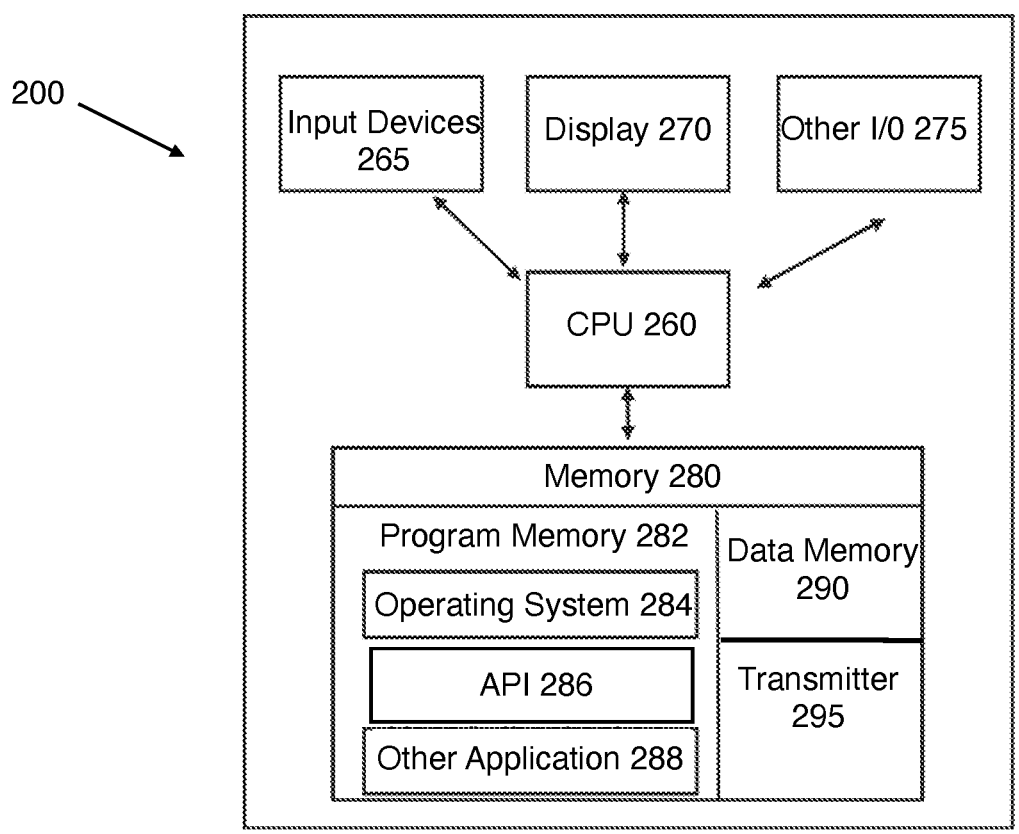
FIG. 11 shows an exemplary block diagram of various components of a computing device associated with the pet cabinet in accordance with an illustrative embodiment.

The dispensing device 180 may have a housing with a hollow frame and a base, including a receiving element for holding a dispenser disposed with dispenser device 180. Dispensing device 180 may have a nozzle 178 and a status indicator 186 on the front or back of the dispensing device 180. In one non-limiting embodiment, the dispenser device 180 may be attached to an interior or exterior wall or other surface in the cabinet 100. As illustrated in FIG. 11, dispensing device may be connected to back surface 120 whereby dispensing device 180 may dispense through an aperture in back surface 120. A cover of the dispensing device 180 may be connected to a back surface 120 or other surface of the pet cabinet 100 using one or more screws or other fasteners, adhesives, or any other means of attachment. In some embodiments back surface 120 may have a removable panel or opening to allow access to dispensing device 180.

In one or more non-limiting embodiments, a dispensing device 180 may include a dispenser bottle (not shown) that is replaceable by the user. User 101 may insert the new dispenser bottle into dispenser device 180. Dispenser device 180 may have one or more buttons wherein when the one or more buttons are pressed, a signal is sent to control system 310 that a new dispenser bottle (not shown) has been inserted into the dispenser device 180.

In some embodiments, dispenser device 180 may include a user interface that allows the user to select a level (correlated to quantity) of deodorizing agent to be released by dispenser device 180, as well as controlling other features or functions of dispenser device 180.

As illustrated in FIG. 7, in one non-limiting embodiment, a filter 159 may be attached to a back surface 120 of the pet cabinet 100 by a connector piece 155, whereby filter 159 may have coal in it to further rid the pet cabinet 100 of unpleasant odors. Connector piece 155 and filter 159 may be removably connected with a push fit or twist locking engagement. In other non-limiting embodiments connector piece 155 and filter 159 may be connected by any number of fasteners such as hinges, latches, buckles or adhesive. One of ordinary skill in the art will understand that such a filter 159 and connector piece 155 may be attached or integrated into other regions of the pet cabinet 100 without limitation.

An exhaust fan 176 apart of dispensing system 330 may secured near or on back surface 120 of the pet cabinet 100. Exhaust fan 176 may be configured to direct air out of the pet cabinet 100, whereby exhaust fan 176 includes a vent and slots through which any air in the pet cabinet 100 may flow into filter 159. In a non-limiting embodiment, exhaust fan 176 is in electrical communication with control system 310. Exhaust fan 176 may be activated by sensor 170 as shown in FIG. 8 and in accordance with a non-limiting embodiment upon the detection of the pet entering into the interior chamber of the arch shaped window and through the opening 136 in the front panel 135. Exhaust fan 176 may operate for a predetermined amount of time after the pet has exited pet cabinet 100 whereby then dispensing device 180 may then dispense deodorizer or after a predetermined amount of time. Exhaust fan 176 may remove the odors associated with the litter box (e.g. as located within the drawer 13) from pet cabinet 100 to filter 159 to provide a more pleasant environment within the pet owner's home.

In some embodiments exhaust fan 176 may be connected to a different exhaust outlet whereby filter 159 is exchanged and connector piece 155 may instead be coupled to an exhaust outlet, piping, or tubing. For instance connector piece 155 may be connected to tubing that is positioned outside the window of a home. In some embodiments, connector piece 155 may be connected to a dryer vent pipe that has a flexible hose. In this configuration an existing dryer vent pipe may be retrofitted with a vent hose y fitting whereby connector piece 155 or tubing attached to connector piece 155 may be connected to the y fitting and an additional exit tubing may connected to the other end of the y fitting. This allows air to exit from the dryer and pet cabinet 100 simultaneously. The flexible hose may be constructed with a thin metal foil or metalized plastic film forming the hose and a metal spiral formed in the hose wall to support the hose and prevent collapse of the hose. The many uses of connector piece 155 increases versatility for different types of houses.

Figure 10:
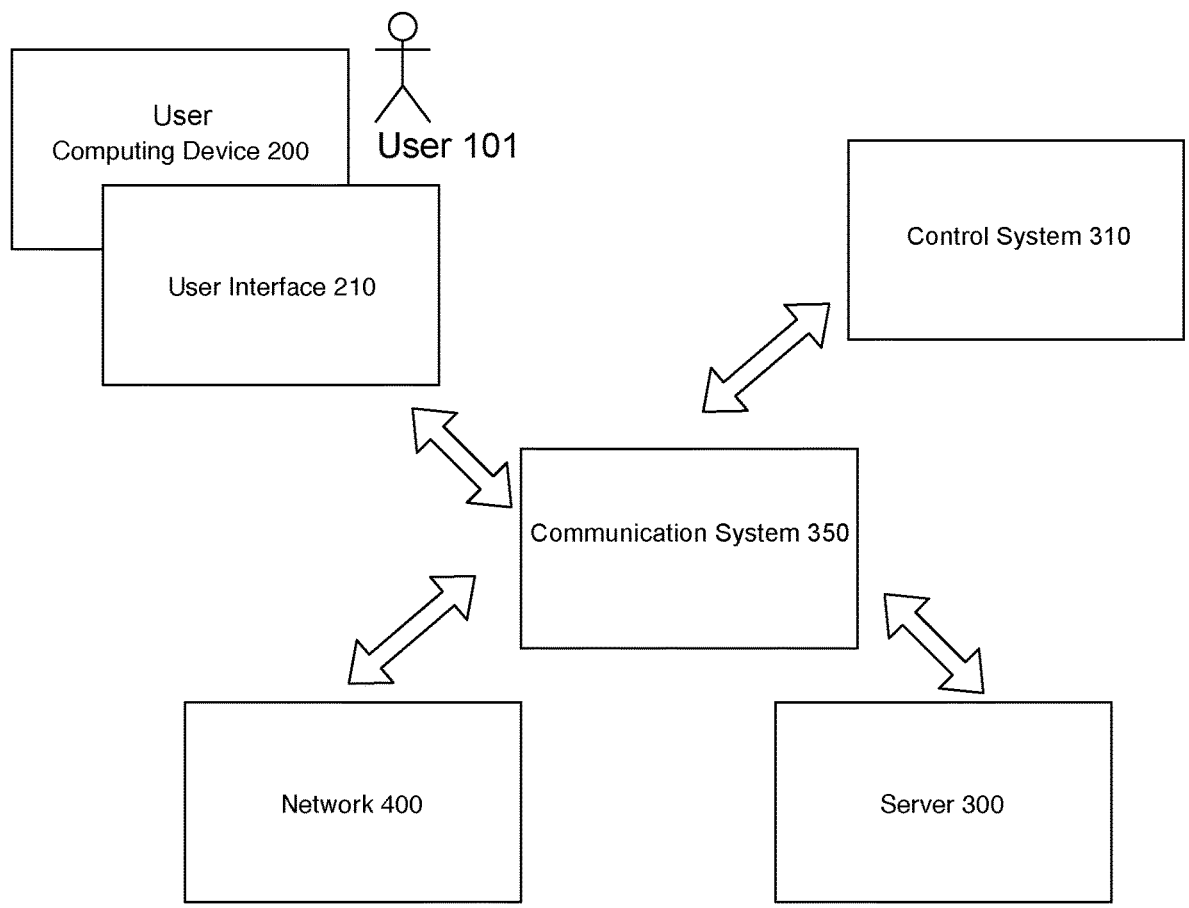
FIG. 10 shows an exemplary block diagram of a communication system of the pet cabinet in accordance with an illustrative embodiment.

Turning to FIG. 10, FIG. 10 shows an exemplary block diagram of a communication system of pet cabinet 100 having any type of computing devices that typically operates under the control of one or more operating systems, which control scheduling of tasks and access to system resources. Control system 310 may be in communication with communication system 350, as illustrated in FIG. 10, to connect with other or computing devices whereby signals transmitted from the computing devices may be received by control system 310. Communication system 350 may allow user 101 to interact with control system 310 using a computing device such as user computing device 200 to monitor one or more connected systems from the pet cabinet 100 on an app on user's computing device 200 (e.g. such as application programming interface (API) 286 shown in FIG. 11).

User 101 may access a user interface, such as user interface 210 using user computing device 200. User interface 210 may have a plurality of buttons or icons that are selectable by user 101 for communication system 350 to perform particular processes in response to the selections. In one or more non-limiting embodiments, communication system 350 may be innate, built into, or otherwise integrated into existing platforms or systems such as a website, a third party program, Apple™ operating systems (e.g. iOS), Android™, Snapchat™, Instagram™, Facebook™, or any other platform.

Computing devices of communication system 350 may be similar to user computing device 200, which will be discussed later, and may be any type of computing device that typically operates under the control of one or more operating systems, which control scheduling of tasks and access to system resources. User computing device 200, may in some embodiments, be a computing device such as an iPhone™, Android-based™ phone, or Windows-based™ phone, a tablet, television, desktop computer, laptop computer, gaming system, wearable device electronic glasses, networked router, networked switch, networked, bridge, or any computing device capable of executing instructions with sufficient processor power and memory capacity to perform operations of pet cabinet 100 while in communication with network. User computing device 200 may have location tracking capabilities such as Mobile Location Determination System (MLDS) or Global Positioning System (GPS) whereby they may include one or more satellite radios capable of determining the geographical location of user computing device 200.

In some embodiments, computing devices 200 may be in communication with one or more servers 300 such as server 300 via communication system 350 or one or more networks such as network 400 connected to communication system 350. Server 300 may be located at a data center, or any other location suitable for providing service to network 400 whereby server 300 may be in one central location or in many different locations in multiple arrangements. Server 300 may comprise a database server such as MySQL® or Maria DB® server. Server 300 may have an attached data storage system storing software applications and data. Server 300 have may a number of modules that provide various functions related to communication system 350. Modules may be in the form of software or computer programs that interact with the operating system of server 300 whereby data collected in databases as instruction-based expressions of components and/or processes under communication system 350 may be processed by one or more processors within server 300 or another component of communication system 350 as well as in conjunction with execution of one or more other computer programs.

Modules may be configured to receive commands or requests from user computing devices 200, server 300, and outside connected devices over network 400. Server 300 may comprise components, subsystems and modules to support one or more management services for communication system 350.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including telecommunications network, a wireless network (including Wi-Fi), and a wireline network. Network 400 may include mobile telephone networks utilizing any protocol or protocols used to communicate among mobile digital computing devices (e.g. user computing device 200), such as GSM, GPRS, UMTS, AMPS, TDMA, or CDMA. In one or more non-limiting embodiments, different type of data may be transmitted via network 400 via different protocols. In alternative embodiments, user computing devices 200, may act as standalone devices or whereby they may operate as peer machine in a peer-to-peer (or distributed) network environment.

Network 400 may further include a system of terminals, gateways, and routers. Network may employ one or more cellular access technologies including 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if for instance they are in a remote location not accessible by other networks.

Turning to FIG. 11, FIG. 11 is a block diagram showing various components of user computing device 200. User computing device 200 may comprise a housing for containing one or more hardware components that allow access to edit and query communication system 350 and connect to pet cabinet 100 remotely over network 400. User computing device 200 may include one or more input devices such as input devices 265 that provide input to a CPU (processor) such as CPU 260 of actions related to user 101. Input devices 265 may be implemented as a keyboard, a touchscreen, a mouse, via voice activation, wearable input device, a camera a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 270 may also comprise a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286 which act application programming interface for interaction for a pet cabinet application, and other computerized programs or application programs such as application programs 288. Memory 280 may also include data memory such as data memory 290 that may include database query results, configuration data, settings, user options, user preferences, or other types of data, which may be provided to program memory 282 or any element of user computing device 115.

User computing device 200 may have a transmitter 295, such as transmitter 295, to transmit the data. Transmitter 295 may have a wired or wireless connection and may comprise a multi-band cellular transmitter to connect to the server 300 over 2G/3G/4G cellular networks. Other embodiments may also utilize Near Field Communication (NFC), Bluetooth, or another method to communicate information.

User 101 may initially register to become a registered user associated with communication system 350. Communication system 350 may be downloadable and installable on user computing device 200. In one or more non-limiting embodiments, communication system 350 may be preinstalled on computing devices 200 by the manufacturer or designer. Further, communication system 350 may be implemented using a web browser via a browser extension or plugin. Server 300 may associate computing devices 200 with an account during the registration process. The account may be user 101 specific or specific to a home, enclosure, or other physical boundary that includes multiple users 101, and a unique identification of each user computing device 200 may be stored in the account.

Upon successful authentication of user 101, a homepage or dashboard may be generated. Homepage may be modified, deleted, written to, or otherwise administered by the respective user 101. Display 270 may be presented to user 101 through user interface 210 that may comprise a number of different subpages viewable or accessible through user interface 210 by selecting one or more tabs, User interface 210 on user computing device 200 may display statuses for multiple pet cabinets 100 that are registered or otherwise communication with control system 310. Accordingly, one area may have multiple dispenser devices 180, each of which may be separately controllable and viewable on a user's user computing device 200. For example purposes only, user interface 210 may display information to user 101 logged into an account that includes three different pet cabinets 100 that may be located in a bathroom, a living room, and a master bedroom of a user's house. A status for each cabinet 100 may be displayed on a list or another format on a user's user computing device 200 (e.g. including a smartphone). In one embodiment, the list may be a dynamic list in which dispenser devices 180 are ordered according to the amount of deodorizing agent in dispenser device 180, the duration of the blowing of any exhaust fans 176 as shown in FIG. 6, or by urgency depending on one or more status indicators from sensor system 340 due to a minimum or maximum threshold being exceeded for light, smell, or humidity parameters. When a cabinet 100 associated with user's 101 account is not connected to control system 310, a status is not displayed for cabinets 100 or, alternatively, a notification may be provided to the user 101 that the cabinets 100 are not connected to the user computing device 200 or the network 400.

Different states of the pet cabinets 100 may be displayed by different indicators through user interface 210, whereby control system 310 receives data from sensor system 340, analyzes the data, and presents the data in the form of status indicators to user 101 through user interface 210 of communication system 350. For example, user interface 210 may display a green circle to indicate that dispenser device 180 is currently active, functioning properly, and has sufficient amount of deodorizing agent in a dispenser bottle located in the dispenser device 180. User interface 210 may display a grey circle indicating that dispenser device 180 is currently inactive but functioning properly and has a sufficient amount of deodorizing agent in dispenser device 180. User interface 210 may display a yellow circle indicating that dispenser device 180 does not have enough deodorizing agent or a fragrance in dispenser device 180. User interface 210 may display a red circle indicating that dispenser device 180 is not functioning properly. These colors are for illustrative purposes only, as one of ordinary skill would understand alternative colors or shapes or forms of indicating these statuses (including via text and words) may be utilized instead.

User interface 210 may have an adjustable timer component for each cabinet 100, whereby the timer component may enable input from user 101 for control system 310 to delay state changes when activating systems. Thus, any releasing of any deodorizing agent or activation of an exhaust fan (e.g. exhaust fan 176 as shown in FIG. 7) may be delayed for an amount of time by user 101 through user interface 210. The amount of time for the delay may be predetermined, at random, or determined by the input obtained from user 101 such as based on the amount of time user 101 selects using a selectable manual button on user interface 210 to activate or fan or release the deodorizing agent into an interior chamber of the pet cabinet 100. In one embodiment, user interface 210 may allow user 101 to release deodorizing agent only at certain times of the day. For instance, user interface 210 may present to user 101 options to switch the state of control system 310 to operate at preprogrammed times, at times determined according to a random pattern, or any other variation. User interface 210 may present one or more clocks that that provides an understanding of time of day, month, year, that the deodorizing agent located in dispensing device 180 is to be released.

User interface 210 may further include a calendar or be synchronized with an outside calendar to display user's 101 activities for a set period of time, whereby control system 310 may be customized through user interface 210 to be active or inactive during these user activities. If user 101 has multiple dispenser devices 180, user 101 may be presented with the option to specify which dispenser device 180 should dispense deodorizing agent while activities are going on, as well as inactivating or preventing certain dispenser devices 180 from releasing any deodorizing agents if desired for a particular period of time. Calendar may have different indicators such as color, shapes, font, or change in appearance to distinguish the different occurrences and the different dispenser devices 180 from one another. In one or more non-limiting embodiments, user 101 may select among multiple templates, designs, or formats in which appointments or events may be presented. User interface 210 may provide user 101 with options to share calendars between accounts.

In other embodiments, control system 310 may have an energy saver mode, whereby user interface 210 may allow user 101 to switch control system 310 to an off or on hibernation state. Further, control system 310 may automatically turn off or enter a hibernation state at a particular time of day or after an elapsed amount of time based on predefined parameters.

User interface 210 may display messages for events generated by pet cabinet 100 such as when a deodorizing agent in dispenser device 180 has reached below a certain threshold or a dispenser device 180 has been replaced. All of the messages for events that occur with pet cabinet 100 may be grouped into a single thread to organize the messages. In a similar manner, user interface 210 may display the history of events for pet cabinet 100.

Thus, multiple advantages and benefits are offered by pet cabinet 100 as described herein. The pet cabinet 100 may provide a secure and safe place for a pet to rest or play. Further, the pet cabinet 100 may provide a location to store a litter for a pet (e.g. such as a cat) to use. A deodorizing system, such as deodorizing system 330, may be useful for removing unpleasant odors from the pet cabinet 100. Further, the pet cabinet 100 may include multiple openings for the pet to access an interior portion of the pet cabinet 100 and thereby access any litter, food, or other contents within the pet cabinet 100. One of ordinary skill may foresee multiple advantages and benefits to the pet cabinet 100 as described herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A cabinet adapted for a pet, the cabinet comprising:
   a lower housing component having a lower portion having a bottom surface, a front panel, a back wall and two opposite side walls, the lower housing component having an interior defined by the bottom surface, the front panel, the back wall, and the two opposite side walls, the front panel having a first opening;
   one or more flaps configured to cover the first opening on the front panel;
   a movable drawer positioned between the side walls and beneath the front panel of the pet cabinet, wherein the movable drawer is slidably disposed below the front panel, the movable drawer configured to hold pet litter wherein the pet litter in the movable drawer is accessible by the pet entering through the first opening of the front panel, which thereby connects to an interior region of the movable drawer where the pet litter is capable of being stored; and
   a first component positioned above the lower housing component, the first component comprising a cavity that is adapted to serve as an interactive play area.

2. The cabinet of claim 1, wherein a surface of the first component includes a layer of synthetic carpeting, wherein the first component is separatable from remainder of the cabinet.

3. The cabinet of claim 1, further comprising, a dispensing device secured to the housing.

4. The cabinet of claim 1, further comprising, one or more sensors secured to an interior surface of the front panel, the one or more sensors configured to detect a presence of the pet when the pet is located within the housing of the cabinet.

5. The cabinet of claim 1, further comprising, an exhaust fan secured to the housing, wherein the exhaust fan is configured to direct air outwardly from the housing, and wherein the exhaust fan is in communication with one or more sensors and a dispenser.

6. The cabinet of claim 5, the exhaust fan configured to direct air through a connector piece positioned on the back wall or the one or more sidewalls, the connector piece removably connected to piping, tubing, or a filter that is positioned outside of the cabinet.

7. The cabinet of claim 6, the connector piece connected to the filter by a push fit or twist locking engagement.

8. The cabinet of claim 5, wherein the exhaust fan is configured to direct air through a connector piece the connector piece removably connected to a dryer vent pipe or tubing.

9. The cabinet of claim 1, further comprising, a ramp to allow access to the first component wherein the ramp is made of multiple components pivotably connected to one another such that the multiple components foldable on top of each other.

10. The cabinet of claim 1, further comprising, a computing system wherein instructions are executed by the computing system to perform:
   wirelessly receiving one or more control signals from one or more sensors; and
   transmitting, in response to the one more control signals, a notification when the pet has entered or exited the cabinet.

11. The cabinet of claim 10, wherein further instructions are executed by the computing system to perform: controlling a state of the cabinet.

12. The cabinet of claim 11, wherein controlling the state of the cabinet includes changing a dispensing duration of deodorizing agent or a fan duration.

13. The cabinet of claim 10, wherein further instructions are executed by the computing system to perform:
   modifying a state of a dispenser or one or more fans at times based upon synchronization with at least a particular time of day or with a calendar.

14. The cabinet of claim 10, the one or more sensors comprising at least one of an infrared sensor, a light sensor, a proximity sensor, or a motion sensor.

15. The cabinet of claim 1, further comprising, one or more sensors secured to an interior surface of the front panel, the one or more sensors configured to detect a presence of the pet by the movement of the flaps.

16. The cabinet of claim 1, further comprising a camera.

17. A cabinet adapted for a pet, the cabinet comprising:
   a housing having a top surface, a bottom surface, a front panel, a back wall and two opposite side walls, the front panel having an opening therethrough;
   one or more flaps configured to cover the opening of the front panel;
   a movable drawer positioned between the side walls, wherein the movable drawer is slidably disposed below the front wall of the housing, the movable drawer configured to hold litter wherein the litter is accessible by entering through the opening of the front panel; and
   a connector piece positioned on the back surface or the one or more sidewalls, the connector piece removably connected to piping, tubing, or a filter that is positioned outside of the cabinet.

18. The cabinet of claim 17 wherein the connector piece is connected to a dryer vent pipe by a Y fitting.

19. A cabinet adapted for a pet, the cabinet comprising:
   a lower housing component having a lower portion having a bottom surface, a front panel, a back wall and two opposite side walls, the front panel having a first opening;
   one or more flaps configured to cover the first opening on the front panel;
   a movable drawer positioned between the side walls and beneath the front panel of the pet cabinet, wherein the movable drawer is slidably disposed below the front panel, the movable drawer configured to hold pet litter wherein the pet litter is accessible by entering through the first opening of the front panel, which thereby connects to an interior region of the movable drawer where the pet litter is capable of being stored; and
   a shelf support component positioned above the lower housing component wherein circuitry for one or more sensors is housed in a cavity located between a top surface and a bottom surface of a second shelf support component.

* * * * *